(12) United States Patent
Demos

(10) Patent No.: US 6,442,203 B1
(45) Date of Patent: Aug. 27, 2002

(54) SYSTEM AND METHOD FOR MOTION COMPENSATION AND FRAME RATE CONVERSION

(75) Inventor: Gary E. Demos, Culver City, CA (US)

(73) Assignee: DemoGraFX, Marina del Rey, CA (US)

( * ) Notice: Subject to any disclaimer, the term of this patent is extended or adjusted under 35 U.S.C. 154(b) by 0 days.

(21) Appl. No.: 09/435,277

(22) Filed: Nov. 5, 1999

(51) Int. Cl.[7] .................................................. H04N 7/12
(52) U.S. Cl. .......................... 375/240.16; 375/240.17; 348/699
(58) Field of Search ...................... 375/240.16, 240.17, 375/240.19, 240.29, 240.27; 348/406.1, 407.1, 408.1, 416.1, 421.1, 422.1, 425.3, 431.1, 441, 451, 452, 699, 700; 382/236, 238; 386/109, 111

(56) References Cited

U.S. PATENT DOCUMENTS

| | | | | |
|---|---|---|---|---|
| 5,351,095 A | * | 9/1994 | Kerdranvat | 348/699 |
| 5,610,658 A | * | 3/1997 | Uchida et al. | 348/416 |
| 5,731,850 A | | 3/1998 | Maturi et al. | 348/699 |
| 5,801,778 A | * | 9/1998 | Ju | 348/416 |
| 5,926,231 A | * | 7/1999 | Jung | 348/699 |
| 5,929,916 A | * | 7/1999 | Legall et al. | 348/419 |
| 6,130,912 A | * | 10/2000 | Chang et al. | 375/240.16 |
| 6,160,850 A | * | 12/2000 | Chen et al. | 375/240.16 |
| 6,208,692 B1 | * | 3/2001 | Song et al. | 375/240.19 |
| 6,229,850 B1 | * | 5/2001 | Linzer et al. | 375/240.11 |
| 6,317,460 B1 | * | 11/2001 | Lee | 375/240.16 |
| 6,332,002 B1 | * | 12/2001 | Lim et al. | 375/240.17 |
| 6,339,616 B1 | * | 1/2002 | Kovalev | 375/240.16 |
| 2001/0041013 A1 | * | 11/2001 | Yamashita et al. | 382/236 |

OTHER PUBLICATIONS

Duc Vo et al., "Precise estimation of motion vectors and its application to MPEG video retrieval", ICIP 99, vol. 3, pp. 279–283, Oct. 1999.*

* cited by examiner

Primary Examiner—Vu Le
(74) Attorney, Agent, or Firm—Fish & Richardson P.C.

(57) ABSTRACT

A system and method for de-interlacing, motion compensation and frame rate conversion of digitally encoded video signals. The invention utilizes multiple motion vectors per pixel of the final image. In a preferred embodiment, this is accomplished by increasing the size of the image, with the amount of size increase depending upon the degree of sub-pixel accuracy desired. In a preferred embodiment, image size is doubled. Thus, four motion vectors are generated for each pixel. Each motion vector is found by searching independently for the best match with previous and subsequent frames. In one aspect, the invention includes a method of temporal processing of motion picture image frames each comprising a plurality of pixels, including the steps of comparing each pixel of a current frame to at least one previous or subsequent image frame; determining at least one motion vector corresponding to each such pixel relative to such at least one previous or subsequent image frame; and saving the determined motion vectors. The invention also includes the steps of applying motion vectors corresponding to multiple image frames to define a new pixel for each pixel of the current frame, and outputting all of such new pixels as a constructed image frame. The invention includes system and computer program implementations.

96 Claims, 4 Drawing Sheets

SYSTEM AND METHOD FOR MOTION COMPENSATION AND FRAME RATE CONVERSION

TECHNICAL FIELD

This invention relates to processing of digitally encoded video and movie signals, and more particularly to a system and method for de-interlacing, motion compensation and/or frame rate conversion of digitally encoded video and movie signals.

BACKGROUND

Frame-Rate and Interlace

At the present time, the world's "standard definition" and "high definition" television systems have parameters which are relatively incompatible internationally. Even within the U.S., the Advanced Television Systems Committee ("ATSC") is proposing a variety of formats which are relatively incompatible with each other, as well as incompatible with other international standards. Of all of the parameters of television systems, the most problematic and incompatible are frame-rate and interlace.

Most video camera and film images are captured with a single picture output rate. The common output rates are 24 frames-per-second (fps) for film, 25 fps (film in Europe for TV), 50 Hz interlaced, and 60 Hz interlaced. It would also be desirable to have 72 Hz and/or 75 Hz display rates in order to eliminate flicker on CRT's and other flicker-type display devices. (Computer displays most commonly use 75 Hz display to eliminate flicker). A 60 Hz display rate (U.S. and Japan NTSC TV) and 50 Hz display (European PAL and SECAM TV) have substantial flicker, which becomes intolerable on large bright screens.

One approach to resolving the problem of multiple incompatible frame rates is disclosed in U.S. Pat. No. 5,737,027, entitled PIXEL INTERLACING APPARATUS AND METHOD, assigned to the assignee of the present invention (hereby incorporated by reference). That system used a special camera pixel pattern to generate multiple frame rates, which are otherwise incompatible, from a common signal using a "Pixelace" technique. The "Pixelace" technique uses sub-groups at a high Least Common Multiple (LCM) frame rate of all desired output frame rates in order to allow output at all of the otherwise incompatible frame rates. However, high frame rates cameras are not yet available which can perform at 1800 fps, which is the LCM of the rates of 24, 25, 30, 50, 60, 72, and 75 fps. Thus, while this system is indeed a solution to the frame rate problem, it requires custom cameras which generate pixels in the "Pixelace" format.

Interlace—the sequential display of a field of even raster lines and a field of odd raster lines to make a single frame—makes any form of video conversion difficult. Thus, re-sizing, speed adjustment, frame rate conversion, or resolution change all become very difficult, and the converted results are usually poor in quality.

For a decade or two, "standards converters" have been offered to convert between 50 Hz interlaced PAL and 60 Hz/59.94 Hz interlaced NTSC. These standards converters have been used for some live international sports events coverage such as the Olympics. Such converters often provide poor results, such as both a soft blurry image as well as peculiar artifacts (such as gymnasts with three legs and four arms during their transient acrobatics).

Some of the artifacts from frame rate conversion are theoretically incapable of being properly detected or repaired. Both interlace and standard image frame capture leave "holes" (i.e., no video information) in their observation of a subject image over time. In particular, interlaced fields have holes between the odd or even scanlines. Thus, for example, small horizontal objects can actually be present in a scene but fall between the unobserved gaps between the scanlines, and thus not appear as part of the video information of any field or frame.

Frame capture on film and video has a duration when a scene is being observed, but also has a time, when the shutter is closed, when there is no observation. This occurs in film because of the need to close the shutter in order to advance to the next frame of film. This occurs in video cameras in order to allow time for the sensor (usually a CCD circuit) to pass the image electrons to the readout electronics. A "short shutter" is also sometimes used to reduce blur in some types of scene, where the amount of time the shutter is closed is manually increased during the capture of a particular scene. For film, the largest duty cycle of open shutter is usually 205 degrees out of 360 degrees for a rotary shutter (57% duty cycle). For CCD sensors, the largest duty cycle is about 80%, depending upon the particular sensor and electronic shutter. FIG. 1 shows an example of a temporal (time) sampling filter for film and CCD cameras. When the shutter is closed (e.g., between the end of Frame n-1 and the beginning of Frame n), no image information is being recorded.

A correct temporal filter cannot be achieved even by a 100% duty cycle (which is a box filter, still subject to some types of aliasing), but would require a time sample for each frame which extended well into the time of previous and subsequent frames. The problem of "not looking" during some of the frame (this is known as "temporal undersampling"), as well as the "box filter" shape of a "constant look" during the shutter-open time, results in theoretically incorrect time filters. This leads to unavoidable "temporal aliasing".

In particular, during the time a shutter is closed, crucial information may occur which is not observed. For example, if at frame "n" a football is to the right of a goalpost, and at frame "n+1" the football is to the left of the goalpost, the crucial information about whether the field-goal was good or not is missing because the shutter was closed during the time the football was passing by the goalpost.

A more optimal temporal sampling pattern would modulate the sensor's sensitivity over time using a function which extends well into neighboring frames. This is not possible with existing 3-CCD sensor cameras (or inexpensive single CCD cameras). Overlap in time implies that multiple CCD's for each color must be used. In addition, current CCD's and their on-off shutters do not allow modulation of sensitivity over time, and would need to be modified to support such sensing patterns. FIG. 2 shows an example of the theoretical shutter characteristics that would result in such a more optimal temporal sampling filter.

It is worthy of note that the Pixelace technique cited above allows such modulated temporal sampling filters to be simulated, by applying scale factors to pixel values within pixel plates based upon their temporal relationship to the filter center time. Further, pixel plates can be applied to construct multiple frames, thereby supporting the overlap necessary for more optimal filters. However, care must be taken to "normalize" the pixel values based upon pixel plate overlap and temporal filter function position. Longer frame times (such as with 24 fps) allow more accurate construction of the filter shape using Pixelace, since more pixel groups are available at the LCM rate to support more data points within the filter shape.

In the absence of new sensor structures, high speed CCDs, or Pixelace compatible cameras, conventional CCD cameras and motion picture film cameras will produce frame (or interlaced field) samples which have inherent temporal undersampling and aliasing. The aliasing will result in artifacts, such as backward-rotating wagon wheels. Aliasing due to undersampling and use of a box filter also make it difficult to de-interlace or make frame rate conversions. Artifacts which occur from such aliasing are harmonically related to the frame rate conversion relationships. For example, a factor of two or three increase or decrease in frame rate (such as 48 Hz or 72 Hz display of 24 fps movies) is better than non integral relationships (such as 3-2 pull-down for 60 Hz display of 24 fps movies).

U.S. Pat. No. 5,852,565, entitled TEMPORAL AND RESOLUTION LAYERING IN ADVANCED TELEVISION (assigned to the assignee of the present invention and hereby incorporated by reference), teaches that some of the frame-rate and resolution incompatibilities may be handled by restricting frame rate capture and display to specific frame rates and resolutions. These formats are preferably matched to the capabilities of a conventional encoding scheme, such as the MPEG-2 and MPEG-4 standards.

The problem of arbitrary frame rate conversion and de-interlacing still remains as a challenge when utilizing the relatively incompatible common TV system parameters at 24, 25, 50, and 59.94/60 Hz. The international television community remains divided into camps, each favoring television format parameters which are incompatible with those of other camps.

Full correction of the spatio-temporal aliasing caused by interlace, and the temporal aliasing caused by temporal undersampling, will remain ever elusive due to absolute theoretical limitations. The best that can be done is to attempt to determine some information about the movement of objects within the scene, and use that information in the most appropriate ways.

Motion Blur

Another key concept in temporal sampling is that of "motion blur". During the time a film or CCD shutter is open, a moving object will "smear" across a number of pixels as the object moves. With a temporal box filter, this smear forms a uniform blur in the direction of motion during the time that the shutter is open. For example, FIG. 3 shows the smeared image that a ball would make moving across a scene from point A to point B while a shutter is open.

At higher resolutions, the number of pixels crossed during the shutter-open blur time is greater than at the lower resolutions of existing standard definition NTSC and PAL television. At lower frame rates, such as film's 24 fps, the shutter is open longer (at 1/40th of a second for a 205 degree shutter) than at 60 fps or 72 fps (where 75% =1/100th of a second shutter), thereby creating larger blur areas for the lower frame rates.

U.S. Pat. No. 5,852,565, entitled TEMPORAL AND RESOLUTION LAYERING IN ADVANCED TELEVISION, teaches a key relationship between motion blur, frame rate, and human visual perception. Based on experimentation, for short shutters (e.g., 20 to 40% duty cycle), a frame rate of 36 fps is much more acceptable to the eye than is 24 fps. 30 fps is found to be on the border of acceptability. These facts become important in temporal layering, since MPEG and other image coders and processors process frames (or fields) as the basic unit of information. Thus, if a subset of frames are to be decoded in order to provide temporal layering, the relationship of frame rate and motion blur becomes a central issue.

It is also worthy of note that the blur from a box-filter (open/closed) shutter is equal over its extent. Thus, a ball moving across the frame will have a uniform dim appearance as a smeared semi-transparent sausage with soft blurry ends and well defined sides, as in FIG. 3. For a more correct temporal filter, however, the smear would be much longer, but would be much more centrally concentrated. FIG. 4 shows how the ball of FIG. 3 would appear if a more correct temporal filter was applied. A semi-transparent ball 40 moving from A to B would appear at the center of a longer "streamer" with ends which faded out on both sides of the central ball 40.

Filtering

While various types of multi-frame filters and noise filters can be used to reduce noise and/or smooth the problems of interlace, static temporal filters can soften certain patterns which can cancel each other due to their pattern and movement (such as stripes which move into their opposite in a field time), or reduce the amplitude of quick events and details. Although these techniques have proven helpful in reducing image noise and interlace artifacts, all comparison, filtering, medians, and processing are done at the same location in the current frame or field with respect to previous and subsequent frames or fields. This results in low effectiveness under normal conditions of motion, since the pixel at the same location in previous and subsequent frames does not represent the same location on a moving object.

Macroblock Motion Search Hierarchy

It has been known for some time that computation is reduced when determining motion vectors by utilizing a hierarchical motion search. For example, the MPEG algorithms attempt to find a match between "macroblock" regions, usually having a size of 16×16 or 8×8 pixels. MPEG, and other motion compensated DCT (discrete cosine transform) coders, attempt to match each macroblock region in a current frame with a position in a previous frame (P frame) or previous and subsequent frame (B frame). However, it is not necessary to find a good match, since MPEG can code a new macroblock as a fresh stand-alone ("intra") macroblock without using previous or subsequent frames. In such motion compensated DCT systems, one macroblock motion vector is needed for each macroblock region.

FIG. 5 is a diagram showing how a current frame macroblock 50 is compared to similarly-sized regions 52 in a previous frame in an attempt to find a good match, and thus define a corresponding motion vector 54. One region 56 will be a best match, and the corresponding vector 58 defining that region's XY (Cartesian) offset from the current frame macroblock 50 will be the macroblock motion vector for the current frame macroblock 50 with respect to the previous frame.

A hierarchical motion search attempts to match a reduced resolution picture with a wide search range, and then do a "fine" match at a higher resolution with a narrower search range, thus optimizing computation. This is accomplished by filtering large macroblocks down (for example, from 16×16 down to 8×8 and 4×4). A coarse match is accomplished using the lowest resolution (e.g., 4×4) blocks and a wide search region. Using the motion vector from the best match from the lowest resolution blocks, a finer resolution (e.g., 8×8) search is made, moving locally around the center defined by the "tip" of the best match motion vector found from the lowest resolution search. Then a final high resolution (e.g., 16×16) search is made, moving locally around the center defined by the "tip" of the best match motion vector found from the finer resolution search, to find the final best match motion vector.

This form of hierarchical motion search is used to reduce the amount of motion vector computation in hardware and software MPEG encoders. The following computation table shows the amount of computations that can be saved for a typical search region scenario (single 16×16 macroblock search computations for a ±31 pixel search region):

| Macroblock size: | 4 × 4 | 8 × 8 | 16 × 16 | Total |
|---|---|---|---|---|
| Exhaustive Search at 16 × 16: | 0 | 0 | 984,064 | 984,064 |
| Hierarchical search: | 3600 | 3136 | 6400 | 13,136 |

The macroblock difference technique of MPEG and similar DCT coding schemes has proven reasonably effective for compression coding. MPEG only requires a statistical benefit from motion vector matches, since it can code any amount of difference using new DCT coefficients. Thus, if one time out of a hundred comparisons the best match is fairly poor, there will be many extra coefficients in the DCT difference, but only for that 1% case. Further, if a match is sufficiently bad in comparison to some threshold, it may be "cheaper" to code an MPEG "intra" macroblock, and thus not depend at all upon any previous frame. These techniques allow MPEG to statistically provide excellent compression, without relying on every macroblock having a good match.

In attempting motion analysis, the entire picture must look good. For motion blur and frame rate conversion, it is unacceptable to have 1% of the picture flying off in the wrong direction, although it may be acceptable in noise reduction and deinterlacing to gain no benefit on a small percentage of the picture. The macroblock technique described above is limited in its usefulness to applications such as compression coding. In particular, 16×16 blocks can yield blocking artifacts if the matches are poor, and these artifacts are among the worst in appearance that MPEG produces, especially since most moving objects do not fit neatly into 16×16 squares. Moreover, the edges of moving objects, along their direction of motion, should be clearly defined down to the pixel. It is also apparent that a stationary object in front of a moving background must also have a clearly defined edge. Further, using only one motion vector per pixel can yield jagged edges and other aliasing artifacts.

SUMMARY

This invention teaches techniques for implementing a variety of temporal functions such as de-interlacing, frame rate conversion, and multi-frame noise reduction. A key element in performing such temporal processing is pixel-level motion analysis. Motion analysis attempts to identify where each pixel, which represents a point on a potentially moving object, might be found in previous and subsequent frames. A set of such identified pixels defines a dynamic "pixel trajectory". A "pixel trajectory" is preferably represented as a motion vector, which collectively indicate where each pixel seemingly has moved from or seemingly will move to from frame to frame.

The invention utilizes multiple motion vectors per pixel of the final image. In a preferred embodiment, this is accomplished by increasing the size of the image, with the amount of size increase depending upon the degree of sub-pixel accuracy desired. In a preferred embodiment, image size is doubled. Thus, four motion vectors are generated for each pixel. Each motion vector is found by searching independently for the best match with previous and subsequent frames.

In one aspect, the invention includes a method of temporal processing of motion picture image frames each comprising a plurality of pixels, including the steps of comparing each pixel of a current frame to at least one previous or subsequent image frame; determining at least one motion vector corresponding to each such pixel relative to such at least one previous or subsequent image frame; and saving the determined motion vectors. The invention also includes the steps of applying motion vectors corresponding to multiple image frames to define a new pixel for each pixel of the current frame, and outputting all of such new pixels as a constructed image frame.

The invention achieves a high resolution and high quality result, with better motion conversion, de-interlacing, motion blur, and noise reduction results than have been heretofore been practically achieved.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

This invention described below teaches techniques for implementing a variety of temporal functions such as de-interlacing, frame rate conversion, and multi-frame noise reduction. A key element in performing such temporal processing is pixel-level motion analysis. Motion analysis attempts to identify where each pixel, which represents a point on a potentially moving object, might be found in previous and subsequent frames. A set of such identified pixels defines a dynamic "pixel trajectory". A "pixel trajectory" is preferably represented as a motion vector, which collectively indicate where each pixel seemingly has moved from or seemingly will move to from frame to frame.

Figure 1:
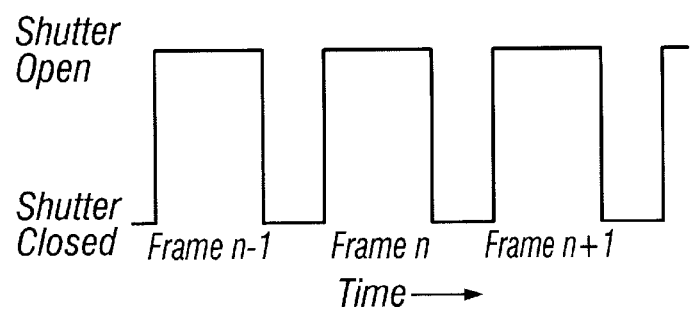
FIG. 1 shows an example of a temporal (time) sampling filter for film and CCD cameras.
Figure 2:
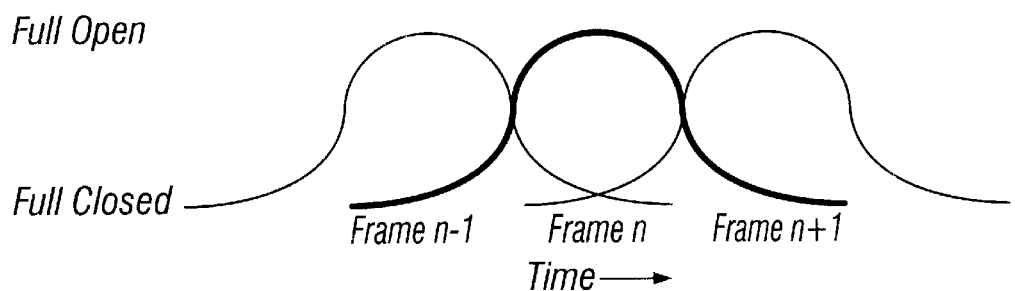
FIG. 2 shows an example of the theoretical shutter characteristics that would result in a more optimal temporal sampling filter.
Figure 3:
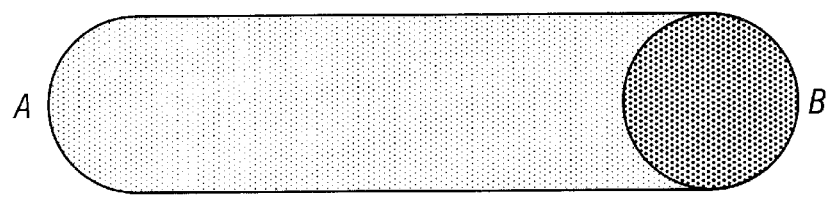
FIG. 3 shows a smeared image that a ball would make moving across a scene from point A to point B while a shutter is open.
Figure 4:
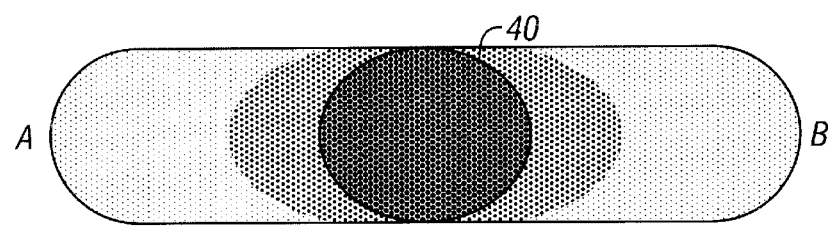
FIG. 4 shows how the ball of FIG. 3 would appear if a more correct temporal filter was applied.
Figure 5:
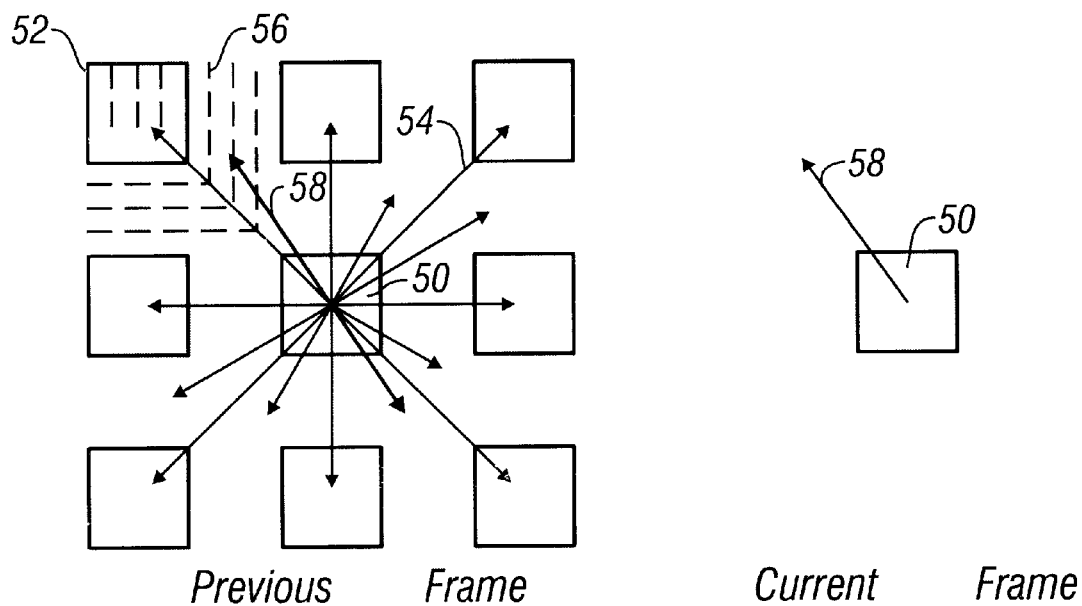
FIG. 5 is a diagram showing how a current frame macroblock is compared to similarly-sized regions in a previous frame in an attempt to find a good match, and thus define a corresponding motion vector.
Figure 6:
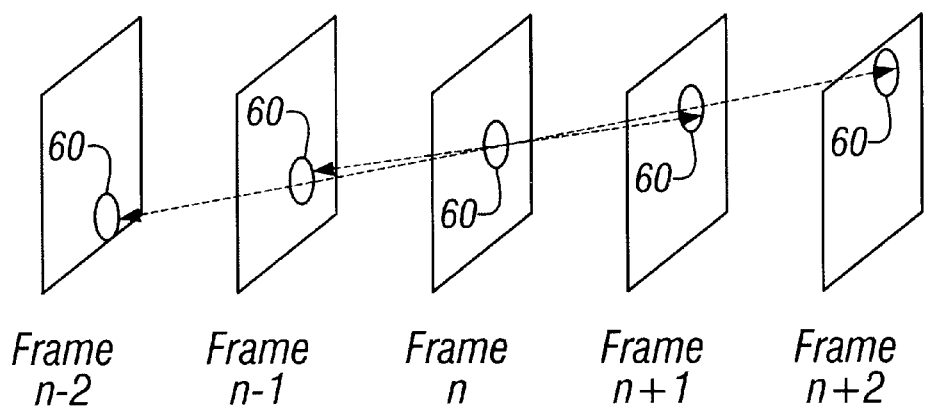
FIG. 6 is a diagram showing the concept of pixel trajectory motion vectors, showing how a region in frame n can be tracked backwards (frames n−1 and n−2) and forwards (frames n+1 and n+2) to different positions in the bracketing frames.

FIG. 6 is a diagram showing the concept of pixel trajectory motion vectors, showing how a region 60 in frame n can be tracked backwards (frames n−1 and n−2) and forwards (frames n+1 and n+2) to different positions in the bracketing frames.

There is inherent uncertainty in motion analysis, since the temporal undersampling inherent in cameras will yield unavoidable pathological cases (such as backward rotating wagon wheels, and such as not looking when a football passes in-front-of/behind a goal post).

There are also cases, such as blowing leaves or sparkling water on a lake, where there is very little correlation from one frame to the next, which suggests use of thresholds and other techniques to determine that no attempt should be made to utilize information from one or more adjacent frames.

Thus, the task of motion analysis is an elusive target, fraught with known pitfalls and inherent inaccuracies. With this knowledge, the invention is directed to processing steps that attempt to make automated estimates which filter out some of the artifactual matches which are inevitable in motion analysis. The invention also provides "confidence" factors that, in addition to the use of thresholds, allow a processing system to weight matches and their utilization. The invention also provides a method of making final judgments based upon several independent (and therefore somewhat orthogonal) techniques, so that the inevitable artifacts of any given technique are reduced somewhat by other techniques whose artifacts have a different and independent nature.

The present invention differs from MPEG and similar DCT coding schemes by utilizing motion vectors and motion analysis in a different manner. In particular, the invention utilizes multiple motion vectors per pixel of the final image. This is accomplished by increasing the size of the image, with the amount of size increase depending upon the degree of sub-pixel accuracy desired. In a preferred embodiment, image size is doubled. Thus, four motion vectors are generated for each pixel. Each motion vector is found by searching independently for the best match with previous and subsequent frames.

Use of Pictures for Motion Vectors

In implementing the preferred embodiment of the invention, it has been very helpful to store motion vectors as picture images. Although motion vectors and confidence factors can be stored in any appropriate way, storing them as picture files (e.g., as RGB data) means that motion vectors and confidence factors can easily be examined with image analysis and viewing tools such as contrast enhancement, histograms, color channel selection, noise filters, and image comparisons such as subtraction.

In the preferred embodiment, the red color channel is used as the X coordinate of a motion vector and the green channel is used as the Y coordinate of the motion vector, with the half-gray value meaning no motion. Thus, when 8-bit color is used, this technique allows a maximum motion vector range of ±127 values. When 10-bit color is used, the range is increased to ±511 values. For 12 bit color, the range is further increased to ±2047 values. Thus, the color values of an image can hold the useful ranges of X and Y motion between adjacent frames or even frames two or more away from a current frame.

In addition to storing X and Y motion vector values in the red and green channels, the blue channel is used to store a confidence factor. In the preferred embodiment, the principal confidence factor for each searched region is the value of the difference between the area which is best matched (minimum difference) between the current frame, centered on the desired pixel, and the area of a previous or subsequent frame (other confidence factors are described below). For example, by normalizing to the range available in the pixel (e.g, 0 to 255 or 0 to 1023 for 8 or 10 bits, respectively), a perfect match would have a value of 0, and poorer matches would have increased values, with the poorest match having the highest difference value. Thus, by viewing or analyzing the blue channel, the quality of the match is available or determinable for each pixel. The blue channel can also be analyzed to determine the quality of overall match by averaging the entire picture's blue value. Regional matches can also be determined, by averaging the blue value (with some distance weighting to localize the result) around a selected pixel or region of interest.

Because the motion vector picture image frames correspond to pixel matches between the current image frame in a moving sequence and some previous or subsequent image frame, the motion vector frames form a viewable motion picture. Thus, the motion vectors for a particular image frame (e.g., between the current image frame and the previous image frame) can be viewed alongside the original image frame. In this way, the determination by the inventive system of motion vectors, as well as the corresponding confidence factors, can be scrutinized against the actual behavior of the original image sequence. This can be useful not only for debugging and optimizing of algorithms, but also for manual assistance in the case where there are multiple passes of optimization.

While the algorithms used in the invention can run unassisted and fully automatically, for some careful work or for some pathological cases, this aspect of the invention provides a tool that readily supports human assistance.

Pixel-Accurate Hierarchical Motion Vector Search

Unlike MPEG-type hierarchical searching, which seeks and finds one motion vector per macroblock, the invention finds multiple motion vectors for every pixel in an image. This makes the task about a thousand times more computation-intensive than an MPEG-type motion vector search (i.e., one motion vector for every 16×16=256 pixels in an MPEG-type search versus 4 motion vectors per pixel for the preferred embodiment of the invention). Further, the preferred embodiment has a requirement that motion vectors be accurate if possible, and that a confidence factor is generated to determine such accuracy. MPEG-type motion vectors only need to be statistically beneficial in prediction most of the time. MPEG-type motion vectors also have a tendency to "jump" around from time to time, as the best match occasionally moves abruptly. The statistical match properties and jumping attributes of MPEG-type motion vectors make MPEG-type matching unsuitable for frame rate conversion. Thus, the invention constructs a hierarchy utilizing different principles than are typically used for MPEG-type motion vector search.

One difference is that the invention preferably uses the same sized matching region; centered on a current pixel, at every stage of the hierarchy. While it is not necessary to make this region exactly the same size at every stage, a constant size makes for convenience of coding. The algorithmic benefit is that the proportion of the image area being matched is much higher at the beginning, lower resolution stages of the search hierarchy. Conceptually, this means that the initial hierarchy search finds a regional match over a region of larger size of the image. Further stages up the hierarchy search smaller amounts of the image, using smaller and smaller matching regions as a proportion of picture area (although the matching region size is constant in terms of pixels).

The preferred embodiment uses a 15×15 match region, extending ±7 pixels above, below, left, and right of each pixel being analyzed. Factor-of-two hierarchical stages are used for convenience, although any reasonably sized stages and any similarly sized match region should also work well using the algorithms described here. The preferred embodiment begins at ⅛ or ¼ of the horizontal and vertical resolution for the first stage of the hierarchy (having 1/64 or 1/16 of the original images' area, respectively).

At the first stage of the hierarchy, the best match is found between all pixels in the match region with the pixels in a previous or subsequent frame, over a specified search region. The search region preferably is specified as a parameter to the search. A typical search uses ±7 or ±15 pixels for the respective ⅛ or ¼ sized initial search resolution. This is a search of a little over 10% of the width and height of the image. If motion is anticipated between frames which is larger than this amount, then larger search regions can be used.

Center Weighting

A common problem in searching for matches occurs with noise-like regions (such as the moving water surface of a lake), and in constant color areas (such as black backgrounds or white walls). For these regions, many matches are possible. Further, matches will be inherently noise-like and will extend (on average) half the entire search range if allowed to do so. Note that an out-of-focus background or a constant color area in the image will have its match position determined by the picture signal's inherent noise (such as camera noise or film grain noise), and therefore will be random. In order to prevent the motion vectors from jumping around and finding of longer matches due to lack of detail to match, an optional distance weighting function is used in finding the best match. It is usually beneficial to bias the search to find closer matches. This is done by applying an exponent (typical range 0.1 to 0.5) to the radius (or distance measure) of the search, and using this factor to weight the quality of the match difference. For similar differences, the closer difference will then be chosen. This technique has proven quite helpful in steering the motion vector search toward the most correct match.

Figure 7:
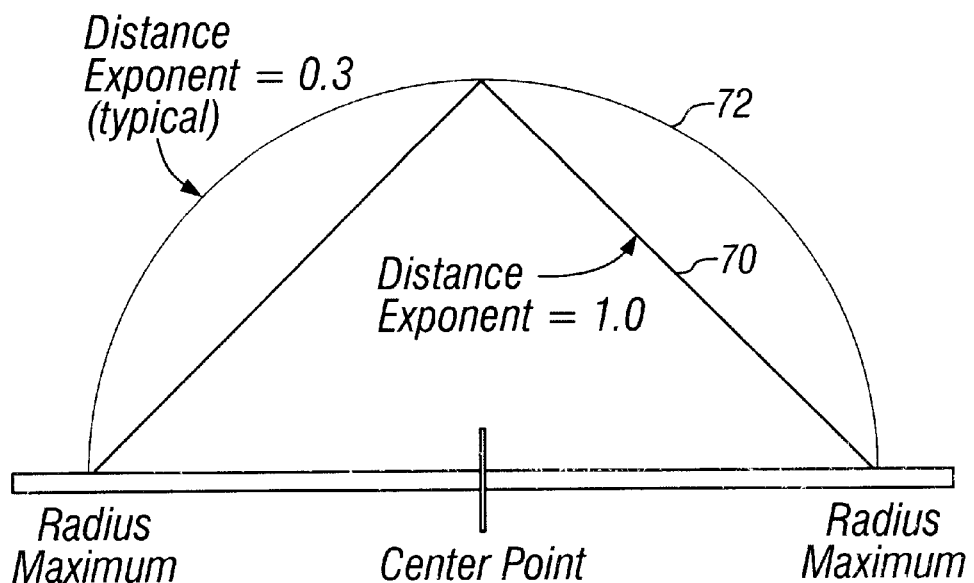
FIG. 7 shows a diagram of two possible weighting functions.

FIG. 7 shows a diagram of two possible weighting functions. A linear weighting function. 70 (distance exponent= 1.0) provides a simple straight line weighting, with pixels at the center point being given maximum weight and pixels at the maximum search radius from the center point being given minimum weight. A non-linear weighting function 72 (distance exponent=0.3) is also shown for comparison. With this function, central points are heavily weighted for a fair distance away from the center point. Weighting then falls off rapidly near the maximum radius.

Picture Edges

In order to allow the edges of a frame to match during searching, the preferred embodiment replicates the edges into an artificial border region using an area surrounding each pixel near the edge. The preferred embodiment "smears" the edge-most pixels by copying them into the border area. Other techniques are also possible for creating simulated border regions, which allow an area matching function to be used. An alternative is to use special case searches at the edge, which do not extend over the edge of the frame.

Using the smearing technique, if objects in the scene are not moving, the smeared edge will be nearly identical from frame to frame, and therefore will not unduly disturb the match at the edges. Finding a match off of the edge is an artifact which should be avoided, since only artificial borders can be created. The smeared edge technique tends to keep the matches on the image itself, and tends to allow the edge pixels to properly match with previous and subsequent frames if there is no motion.

Figure 8:
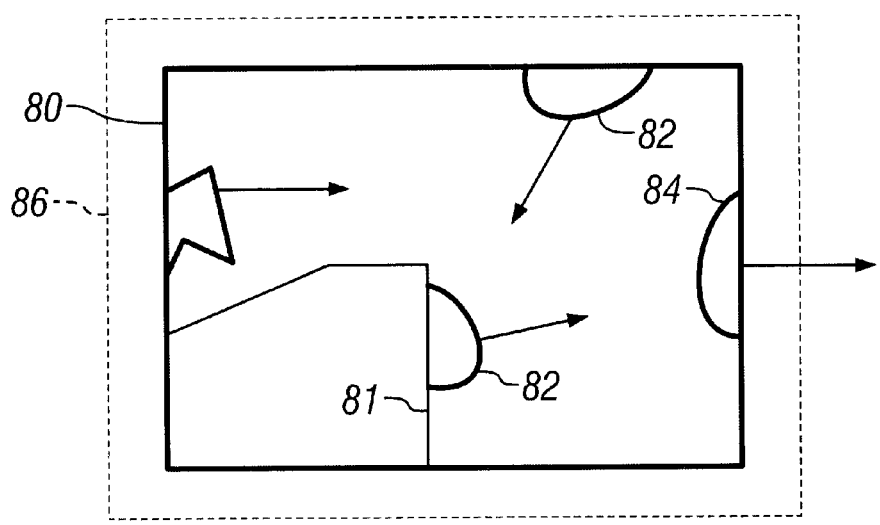
FIG. 8 shows a scene in which objects overlap a frame edge or internal edges.

FIG. 8 shows a scene in which objects overlap a frame edge or internal edges. For example, at the edges of the image (left, right, top, and bottom), when the camera is moving (pan, tilt, or zoom), picture detail will be entering or leaving the image 80. (FIG. 8 also shows an artificial image border 86 generated as described above). An edge 81 within the frame (e.g., a wall), even though it is not at a picture edge, can also have similar effects. If picture detail 82 is entering, then previous frames will contain no useful match. If picture detail 84 is leaving the frame, then subsequent frames will contain no match. For all of these cases, a poor value in the confidence factor helps determine that no match was found on the previous or subsequent frame.

Hierarchy Step-Up

Figure 9:
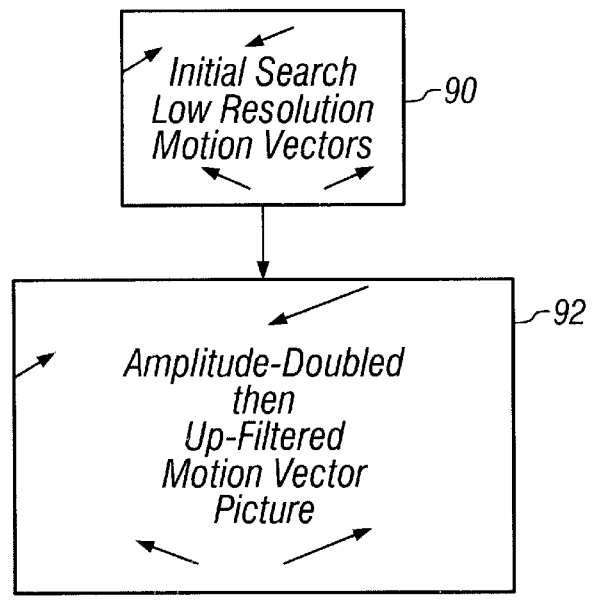
FIG. 9 shows a diagram of a first-level motion vector search and an amplitude doubled second level motion vector search.

Using the motion vectors created by the matches found at the first level of the hierarchy, the system begins moving up the resolution hierarchy. This is done by first increasing the amplitude of the motion vectors (e.g., by doubling or increasing by some other useful hierarchical step size, such as 3/2). The corresponding distances are increased proportionately (e.g., twice as far at double the resolution). Then the motion vector picture is up-sized by the hierarchy step size, since the amount of amplitude increase and the amount of picture upsizing must match. For example, amplitude doubling and picture size doubling correspond exactly, since the motion vectors now point to the same correct place on the double resolution picture. Similarly, if other up-sizing factors are used (such as 3/2 or 4/3, or any other arbitrary size), then the motion vector amplitudes must also be scaled by this identical factor. FIG. 9 shows a diagram of a first-level motion vector search 90 and an amplitude doubled second level motion vector search 92.

With this approach, pixels in-between those found during the lower resolution initial search will be inherently interpolated between their neighbors by the corresponding up-sizing filter. The preferred embodiment uses a good up-sizing filter, having negative lobes, to preserve as much picture detail in the motion vector picture as possible, corresponding to true picture detail. However, since actual picture detail at the next resolution is not available in the lower resolution image used for the prior stage of the motion vector search, the new motion vectors from up-interpolation will need to be re-examined, especially at sharp moving edges within the picture. This will mean that, even if the first matches were perfect, the new picture detail will need to be searched over a region potentially as large in extent as the original search. However, such a broad search would be very computationally intensive. Therefore, one or more confidence factors are used to help determine that poor matches may exist on fine moving object edges, rather than attempting to exhaustively find the best match.

Thus, again using the selected match region size (e.g., a 15×15 pixel region), the system performs a refined search. The match region is now proportionately reduced in area (e.g., ¼) over the picture. Thus, the system is comparing the match region to a smaller and more detailed portion of the image. This search will cover a much smaller region (e.g., such as ±3 pixels in the next step up) at the new higher resolution, and look for a locally optimal match rather than attempting to find an overall best match. Thus, the system performs an initial coarse search and refines the match over smaller regions at higher resolutions, rather than attempting to define and refine stark edges with highly divergent motion vector matches. The concept is not only to reduce computation by localizing these searches over a small region, but also to avoid artifacts by relying on the center-weighted original search, which used a fairly large search region (measured as a percentage of picture area).

The refined search is accomplished by using the motion vectors from the lower level (up-sized and correspondingly amplitude increased) as an initial "guide vector" for the refined motion vector search. After the fine localized search is completed, then a new refined vector is created (which may be stored as another picture for convenience).

As the system goes up to each next stage in the search range resolution hierarchy (for example, from ¼ up to ½, and then up to full size), it can use even smaller local search ranges, such as ±2 pixels. Note that a ±2 pixel search range at a given resolution would correspond to ±1 unit search in the next lower level of the hierarchy. At the lower level the search typically would be over a larger region, such as ±3 units. Thus, the search is being narrowed, as well as using a smaller match region (in this example, a 15×15 match region would represent ¼ the size for each hierarchy step, in terms of percentage of the total picture size).

Again, the up-sized and correspondingly amplitude-increased motion vectors from the lower layer are used as guide vectors for a refined search on the subsequent layer. Again, the system creates new "refined" motion vectors as the output of this search.

Note that the use of a factor of two as the up-sizing step is somewhat beneficial to the precision of this process, since the double-sized motion vector picture which is created will point to specific pixels in regions where the motion vectors are not varying (regions of constant motion and constant motion match). However, the up-filter will create sub-pixel locations until the values are rounded to the nearest integer pixel. This problem is handled automatically in the preferred embodiment by using pixel color values as motion vectors. These pixel values are inherently integers, which therefore point to integral pixels after being filtered and rounded. It turns out that each next step of refined search makes this issue less of a factor since several pixels are used in the refined search. However, if the refined search only searches plus-and-minus a single pixel, corresponding to ½ pixel in the lower level of the hierarchy, then the factor of two turns out to have significant benefit.

Sub-Pixel Resolution Via Resolution Which is Increased Above the Original Image In the hierarchy used in the preferred embodiment, the system starts from either ⅛ or ¼ resolution search regions, and then goes by factors of two through ¼ (if starting at ⅛), ½, full size, and then up to double size search regions. The search range at double size is just ±1 pixel. This corresponds to ±½ pixel (i.e., sub-pixel size) in the final image at full resolution. Thus, the final match step, using a match region which is relatively small with respect to the final image (e.g., 15×15 pixels on the double resolution image), finds the best match motion vector to the nearest pixel at double resolution.

A larger fine search, using the relatively small match region at this increased resolution, may also be useful, since a fine detail match region with independent motion may find a match somewhat different in position from the larger match regions used at lower points in the hierarchy.

Of course, other hierarchy values can also be used, as well as other configurations of match region size and search range. In the preferred embodiment, the system stops at double the size of the input images. This provides ½-pixel resolution, and provides four motion vectors for each pixel of the final result. For even finer resolution, even higher resolutions of motion searches can be utilized as the top of the hierarchy, providing even more sub-pixel resolution and even smoother motion by determining even more motion vectors for each final pixel.

Match Criteria

In attempting to match a location within a current frame to find the corresponding object location in a previous or subsequent frame, a match criteria needs to be defined. In the preferred embodiment, the principal match criteria is uniformly weighted over the pixel matching region (e.g., 15×15 pixels). At each pixel, a computation is made of the absolute value of the sum of the differences of red, green, and blue, plus the sum of the absolute values of the individual differences, for the current frame ("self") and a frame being matched ("other"). This is shown as follows:

$$\text{pixel}_{13}\ \text{diff}=\text{abs}(r\_\text{self}-r\_\text{other}+g\_\text{self}-g\_\text{other}+b\_\text{self}-b\_\text{other})+\text{abs}(r\_\text{self}-r\_\text{other})+\text{abs}(g\_\text{self}-g\_\text{other})+\text{abs}(b\_\text{self}-b\_\text{other}) \quad (\text{EQ. 1})$$

$$\text{diff}\_dc=\text{sum}\_\text{over}\_\text{region}(\text{pixel}\_\text{diff}) \quad (\text{EQ. 2})$$

Equation 1 essentially has two terms. The first term, being the absolute value of the summed differences in pixel colors, helps reduce the influence of noise on the match where the original camera sensor (or film) has uncorrelated color channels (which is usually the case). Noise will most often be uncorrelated between the colors, and is therefore likely to go in opposite directions in one color versus another, thus canceling out the difference, and helping find a better match. The second term sums the absolute values of the differences. The reason for the use of this term in Equation 1 is to attempt to detect a hue shift, since the first term may not be noise, but rather might have a sum of zero if the red channel increases by the same amount as the blue channel decreases (when green stays the same). Thus, these two terms together help detect a match. It is also possible to bias toward green, which is the typical perceptual bias used in luminance equations, or to use luminance itself for the match. However, the ability to reduce uncorrelated noise as an affect in the match by keeping the red, green, and blue channels separate in the above function is lost when using luminance. However, luminance matches should also work acceptably. (Note: it is typical in MPEG-type motion vector searches to use only luminance matching). Equation 2 sums the results of applying Equation 1 over the match region. Equation 2 is thus used to provide a total match value or confidence factor for each particular match region/search region comparison. The best match in the search will be the location of the minimum value for diff_dc in Equation 2.

However, this "area difference" function does not detect cases where an object is moving into the light, or out of the light, or where the overall picture is fading up or fading down to black. In such cases, it would still be useful to match the objects in the image, since noise reduction and frame rate motion conversions would still work properly, even if the overall lightness of the match is changing. To detect a match under such conditions, a different "AC" (for changing conditions) match required that removes the overall change in brightness. Such a match requires an AC correlation function, wherein the DC (or constant component) bias is removed from the area difference. This can be accomplished by multiplying the pixels of both images instead of subtracting them, thus finding the best correlation for the match function. For the multiplication, the DC term can be removed by subtracting the average value of each match region prior to multiplication. The multiplication then goes both positive and negative about the average value, thus determining only the AC match.

In the preferred embodiment, the AC correlation match function is generated as follows:

average_self(red)=sum_over_region(red_self)/pixels_in_region average_self(grn)=sum_over_region(grn_self)/pixels_in_region average_self(blu)=sum_over_region(blu_self)/pixels_in_region average_other(red)=sum_over_region(red_other)/pixels_in_region average_other(grn)=sum_over_region(grn_other)/pixels_in_region average_other(blu)=sum_over_region(blu_other)/pixels_in_region    (EQ. 3)

pixel_diff_ac(red)=(red_self−average_self(red))*(red_other−average_other(red))

pixel_diff_ac(grn)=(grn_self−average_self(grn))*(grn_other−average_other(grn))

pixel_diff_ac(blu)=(blu_self−average_self(blu))*(blu_other−average_other(blu))    (EQ. 4)

diff_ac=sum_over_region(pixel_diff_ac(red)+pixel_diff_ac(grn)+pixel_diff_ac(blu))    (EQ. 5)

The AC match function is a maximum area correlation/convolution function. The average value of the regions being matched provides the DC terms (Equation set 3). The regions to be matched have their pixels multiplied after subtracting the DC terms (Equation set 4), and then these multiplied values are summed (Equation 5). The largest value of this sum over the search region is the best correlation, and is therefore the best match.

Luminance information can also be used in determining the best AC match function (biasing the difference more heavily towards green). Nothing is lost here from using luminance or other color weightings, since the multiplicative function does not inherently help cancel noise between the channels. However, hue changes having the same luminance could incorrectly match. This is avoided by using the sum of the correlations of all three colors. It should be noted, however, that an AC match function cannot find a hue and brightness match between frames, only a detail match. A hue or brightness match is fundamentally a DC match, using the minimum area difference function (Equation 2) described above (which is equivalent to subtracting the two DC average values of the match regions).

For regions without detail (such as black, out-of-focus, or constant-color areas), camera sensor (or film grain) noise tends to dominate the signal, leading to artifactual matches. Thus, a combination of the influence from the AC maximum area correlation match and the DC minimum area difference match is likely to form the optimal match function if attempting to provide for matches during fades or lighting changes (which are statistically fairly rare, typically being about 1% of a movie). The combination of these two match functions may require scale factors and inversion of one of the functions (typically the AC maximum area correlation match function), since the system determines an overall minimum for the DC minimum area difference match function, whereas the AC maximum area correlation match function involves the maximum correlation value using products. Also, both of these functions have different sensitivities to matching. However, suitable adjustments to weightings, scale factors, and perhaps exponentiation can yield any desired balance between these two independent functions in finding the optimal match as a combination of the minimum difference and the maximum correlation over the match search region.

As an alternative to combining the two matching functions described above to form a single matching function, another (somewhat more preferable) approach is to retain the separate match functions as independent results. This allows somewhat independent matches to create independent motion vectors and motion compensated results for later combination and subsequent processing.

Motion-Compensated Picture Result

For each pair of frames which are analyzed for motion, the corresponding set of motion vectors can be used as the basis of creating a "motion-compensated" image. The motion-compensated image results from gathering each pixel in the matched frame that is indicated by the motion vector of an associated pixel in the current frame. This results in an image which is composed entirely of pixels from the matched (either previous or subsequent) frame, moved into their best match position defined by the motion vectors of the current frame, to generate a motion-compensated frame.

By combining multiple such motion-compensated images from both previous and subsequent frames with the current frame, noise reduction and de-interlacing can be achieved Thresholds and weightings, based upon per-pixel as well as regional and overall confidence factors, can be used to steer the use of the motion vectors for frame-rate conversion as well as control the weightings of the various frames combined from the motion compensated images. For example, if the match for a current frame is good overall, or regionally, or per-pixel, with a previous frame, but not with a subsequent frame, then the motion compensation and motion vectors for the current frame can be made to rely much more heavily on that previous frames' motion vectors and motion compensated image. Where several previous and subsequent frames are used (a typical embodiment), there will also be a natural tendency to rely on the adjacent previous and subsequent frames, in preference over frames two or three previous or subsequent, since these adjacent frames are closest in time, and thus should form the basis of the closest match.

For motion compensation of interlaced frames, in the preferred embodiment a set of working image frames are made before motion-compensation processing by vertically up-filtering the interlaced fields, each field being represented by a frame of data (a "field-frame"). In this case, the field-frame which is two away from the current field-frame will have some aspects of better correlation, since it samples the identical image lines as the current field-frame, even though the field-frame which is one away from the current field-frame is more adjacent in time. When dealing with motion, it will not be predictable whether the adjacent field-frames will be a better match, or whether the field-frames two away will fit better. The match characteristics may be different on an overall frame basis, on the basis of regions within the frame, or even at each pixel, depending on the character of motion within the image. Thus, it is beneficial to utilize a variety of match functions, both AC (maximum area correlation) and DC (minimum area difference), as well as a variety of ways to combine the resulting motion compensated images, utilizing various pixel-local, regional, and overall confidence values.

Confidence Measures

By applying both of the match function types described above, the current image and the image in a previous or subsequent frame can have two independent motion vectors per pixel. Thus, two independent motion compensated pictures can be constructed per pair of frames. One motion vector set, and its corresponding motion-compensated image, comes from the DC minimum area difference match function, and the other motion vector set, and its corresponding motion-compensated image, can be made from the AC maximum area correlation match function. The preferred confidence factors are the difference of the best match in the case of minimum difference (diff_dc in Eq. 2), and the inverted value of the best correlation in the case of maximum correlation (diff_ac in Eq. 5). The set of confidence factors for each frame can be utilized to help weight the use of the two match functions. Where the motion vectors are the same between the two types of matches, and where the confidence factors show high confidence (i.e., exceed a selected threshold), then the motion vectors and their corresponding motion-compensated images can be used with confidence.

Where the confidence for the DC minimum area difference match function is better than the confidence for the AC maximum area correlation match function for a given pixel, the DC match function and overall match would be known to be better, but the AC match function and detail match would not be as good. Conversely, if the AC match function is strong, but the DC match function is poor, then the pixels in this region of the image likely have a good correspondence, but that the hue or brightness is shifting between the frames. The overall frames or overall regions within the frames can also be evaluated for these same criteria by summing and comparing the overall or regional values of these confidence factors.

Thus, the set of confidence measures can be used for weighting sums when combining various frames (or field-frames) and when combining various terms (such as minimum-difference and maximum-correlation). Confidence factors can also be used when doing frame rate conversions to determine which information has the highest confidence and to improve the weight for utilizing those terms.

The confidence measures frequently break down (i.e., the confidence measures, when thresholded, indicate that matches are poor) when the best matches are clearly not good matches at all. This case can be detected utilizing a threshold on the match value. In the case of the DC minimum area difference match function, the threshold would be a value above which the minimum difference would be too high, and thus the match would be considered to have failed. For the case of the AC maximum area correlation match function, the value would be too low, such that an AC match would be too poor to consider as being a match. Here the threshold would be a value below which the correlation is too poor, and the match should be considered as having failed.

Matches generally fail when an object enters the frame or leaves the frame edge or when an object crosses behind a wall edge within the scene. Matches generally fail if there are flashes or explosions in the frame which are very different from one frame to the next. Matches generally fail with noise-like rapidly changing image features such as the surface of the water of a lake or blowing leaves on a tree. These failed matches can all be detected locally by the use of an area difference match confidence factor computed for every pixel (both diff_dc and diff_ac). The pixel-level confidence factors for an image region can also be averaged in order to determine if confidence is high or poor locally. Further, the pixel-level confidence factors can be averaged over the entire frame to determine an overall frame match. The overall confidence factor can be used to detect cuts in the picture. It can also be used to detect 3-2 pulldown cadence when extracting film from telecine'd video. Moreover, an overall DC minimum area difference match vs. AC maximum area correlation match can be used to determine fade-out or cross-dissolves, where the DC minimum area difference match has a constant direction of bias, but the AC maximum area correlation match remains strong and consistent. Accordingly, the pixel-detailed confidence, regional confidence, and overall confidence factors all contain useful information.

In addition to considering matches for the match region centered around each pixel, it is also useful to look at the exact pixel match. For example, even though the AC maximum area correlation and DC minimum area difference matches might be good, the center pixel of a region in a matching frame, when using the translation defined by the best match motion vector, might be quite different from the corresponding center pixel in the current frame. For this case, a pixel-difference threshold value can be utilized, above which the pixel in the matching frame is deemed to be too different and is therefore marked as not being a match. This case can occur on sharp edges, where the overall edge may match but where a pixel on the edge in the matching frame is too different. This can be affected by the shape of the edge changing slightly (such as with moving clothing) as well as by sub-pixel matching considerations (which is similar to aliasing issues). Interlace can also result in substantial center-pixel differences, even though the overall match region matches reasonably well at all levels of the hierarchy.

There are reasons not to consider the center pixel match when the region around the pixel is matching. For example, in motion-analysis used in frame rate conversion, some motion vector is needed, and the interpolation of the center pixel value will solve the pixel difference issue. In interlaced frames, the center pixel difference may, or may not, be detail in the image being viewed. This difference may alternatively represent interlace artifacts. Thus, the center-pixel-match threshold is an independent criteria which has proven most useful in motion compensation and noise reduction. For noise reduction, it is statistically desirable to average a number of pixel values which are near one another in color value, on the assumption that it is most often the case that the pixels are indeed matched and represent the same pixel value from the original image. On this basis, averaging a number of such pixel values will reduce the noise which occurred in the camera (and elsewhere as well). Interlace artifacts have some of the same characteristics as noise, although there are other aliasing artifacts which are correlated to image detail interacting with the raster. It is not possible to distinguish between the aliasing artifacts (which are nearly impossible to remove) and the noise-like properties of interlace. However, the pixel-value threshold provides a way to pass high amplitude pixel differences, treating them as signal, while averaging the low amplitude pixel differences, treating them as noise. This works about 75% of the time, although the degree to which it works is completely image dependent. Some images have many black vs. white details which are horizontal, which is the worst pathological case for interlace. In such images, there will be many high amplitude pixel differences, which will be passed even by a relatively high pixel threshold. Some interlaced cameras are sharper vertically than others (in both HDTV and standard TV). Those cameras which are sharp will have high amplitude interlace artifacts, whereas interlaced cameras with low vertical detail will behave in a manner which is closer to noise, and will fall below a normal pixel difference threshold.

It may be desirable to save the minimum area difference confidence factor and the maximum area correlation confidence factor as separate values. As mentioned above, the preferred embodiment can store one confidence factor in the blue channel of an RGB data stream. A second confidence factor can be stored in a separate picture or an alpha (transparency) channel, or in a non-pictorial format. In this way, the different confidence factors can be applied independently, where most useful.

It is also useful to decide how and when to apply pixel thresholds based upon a knowledge of the type of images. It is always known whether images come from film or from interlaced or non-interlaced video cameras. For film images and non-interlaced video images, when motion compensation is desired, the pixel threshold is very useful for noise reduction. Noise reduction is very beneficial to the quality of image compression, including the layered compression technique described in U.S. Pat. No. 5,852,565. Thresholds also can be set to a desired value (empirically determined) for de-interlacing prior to compression in order to preserve the temporal clarity of high amplitude details in interlaced images (for values greater than the pixel threshold, forced to the current field-frame), while reducing overall picture interlace artifacts and noise (for values lower than the pixel threshold).

In addition to confidence factors as described above, it is also possible to extract other information about the image and its motion. For example, the local gradient of the motion vector picture indicates motion change edges. This can be used as a factor (along with color and shape) to help determine the outline of moving objects within the image. The gradient will be high near edges of moving objects, since the motion vectors will be in transition from indicating the direction and magnitude of motion of the moving object to indicating the direction and magnitude of motion of the background behind the object. Thus, the gradient of motion vectors can be an aid to image segmentation when moving objects are involved. Areas of constant motion will have constant pixel values in an embodiment that uses pictures to represent motion vectors (e.g., via red and green channels).

The gradient and the pixel values give an indication of the nature of motion of various objects within the image. Turbulent regions, such as the surface of a lake or the blowing leaves of a tree, can be detected by integrating the local gradient of the motion vector image at each region of the image. Turbulent parts of the image will exhibit a high average gradient, as well as a lack of correlation between the noise-like gradient values. Edges of moving objects will show distinct edges to the gradients, with smooth pixel values on either side of the edge. These and other measures which are computed based upon the motion vectors and confidence factors can be helpful in image analysis and image processing, even to the point of aiding in moving image object and motion segmentation.

Applying Motion Compensated Thresholds

A convenient way to visualize thresholds for the various confidence factors is to initially set all confidence measure image values to the maximum possible value (e.g., 255 for 8-bit, 1023 for 10-bit), meaning lowest confidence. In the preferred embodiment, this results in a highlighted blue color as an indicator that a given pixel exceeded a selected threshold (which may be lower than this maximum color value). The blue channel is then loaded with confidence factor values, such that the best match is the lowest difference. The result is that any confidence factor that exceeds the threshold (whatever the value of the threshold) has no new value written to the blue channel. Thus, the corresponding pixel will appear as a highly visible bright blue color. Use of larger vs. smaller values to indicate confidence is not important, except that bright areas are more visible, and thus are better to see problem spots where there is low confidence.

In an alternative embodiments individual bits can be set indicating failure of any of several confidence factors (e.g., area difference threshold failure, correlation threshold failure, and pixel-difference threshold failure). Threshold checking may also be disabled.

It is also possible to optionally "zero-out" the motion vector for a given pixel when a match threshold is exceeded. The meaning of doing this, at various stages of the hierarchy, is that no area match was found below the threshold of desired match quality. Thus, when moving up to the next level in the search hierarchy, the search begins around the immediate same neighborhood as the current pixel, rather than the neighborhood indicated by the coarser match motion vector. If a new match is then found at that next level which is good enough to be below that level's threshold, then a nearby match has been found at this next level. In this way, artifactual far-away matches can be reduced. However, there is no guarantee of a nearby match by resetting the motion vector to zero in the case of area match threshold failure at a lower level. Thus, this technique is only a way to attempt to find a match at higher resolutions in the search hierarchy when no acceptable match has been found in the current hierarchy level.

Another application of the match threshold is to set a motion compensated pixel's value to the value of the corresponding pixel from the current frame, eliminating any influence from the nearby previous or subsequent frame that is being examined for a possible match. This can be done in the case of DC minimum area difference match failure, AC maximum area correlation match failure, and/or pixel difference threshold failure. If separate motion compensated images are being made from the area match difference and the area correlation, then the respective threshold for each match can be used to determine whether the motion compensated output pixel should be set to the current frame's pixel in each respective motion compensated image.

The thresholds will automatically help steer other uses beside motion compensation and noise reduction, such as frame rate conversion and associated motion blur, if the confidence value is set to maximum (lowest confidence) in the case of a threshold failure. This will usually happen automatically in the preferred embodiment whenever these processes utilize a confidence factor, since a low confidence value is accentuated by setting the confidence factor value to the poorest value possible when a given threshold is exceeded.

Use of Multiple Frames

As mentioned above, assurance of validity of any given matching technique is low. There are many cases where no good match is theoretically possible. There are also cases where a given match might be somewhat helpful, but may not necessarily be the best match possible for a particular purpose. In order to improve the result in the preferred embodiment, a number of matches are used between the current frame and a number of future and previous frames. The system can then take these results and process all of the resulting the motion vectors so as to attempt to reduce the influence of artifactual matches.

In the preferred embodiment, the system typically looks two frames back and two frames ahead when no interlace is involved (such as the 480P and 720P formats, as well as 2kx1k and other film-based resolutions). For interlaced images, fields are converted into frames by vertical up-filtering. Three fields are then combined using a weighting function (e.g., 0.25, 0.5, 0.25 or 0.333, 0.666, 0.333 weighting). These partially-temporally-smeared frames, which each represent a combination of three adjacent fields, then form the "frames" which are further processed. The system then uses two or more of the previous and subsequent "frames" with respect to the current "frame", where each "frame" is similarly constructed.

As mentioned above, the current frame and any previous or subsequent frame can be matched using the DC minimum area difference function or the AC maximum area correlation function. Thus, two sets of motion vectors can result from each of the matches. The matches to the adjacent previous and subsequent frame are likely to be more adjacent in time, and therefore will be accurate statistically more often. However, the frame from two or more frames back and subsequent may also match a high percentage of time. Thus, although the system is likely to give more weight and confidence to the matches from the two immediately adjacent frames, it can still usually benefit from looking two frames away. The system counts on statistics and multiple values, as well as the use of thresholds, to minimize the random influences of poor matches, which are inevitable and will be worse on the frames further away than the frames closer to a current frame.

One way to combine the motion vectors from multiple frames is to utilize medians and averages. In the preferred embodiment, a median (the middle value in X and Y, independently) is computed between various groups of three frames. The preferred embodiment utilizes the previous two frames and one subsequent frame to compute a "previous biased" median, and one previous frame and two subsequent frames to compute a "subsequent biased" median. The two medians can then be averaged to provide a "middle" motion vector representing motion over multiple frames. Further, the number of "middle" medians can be doubled using the DC minimum area difference and the AC maximum area correlation match functions. The motion vectors also can be averaged in a weighted sum, for example, by averaging the motion vectors to the previous and subsequent adjacent frame with a higher weighting than to the frames which are two away from a current frame. A typical weighting might be 30% previous, 30% subsequent, 20% two-previous, plus 20% two-subsequent. This gives two more motion vector estimates for the AC and DC matches. Combining the four AC and DC motion vectors with the two or more previous and subsequent frames results in more than a dozen motion vectors that are available for use.

If all of these vectors agree (as determined, for example, by statistical variance), then the vectors can be given high confidence. This would mean that the motion vector direction is consistent by all of the different criteria and frames used to determine them. If they disagree, the statistical variance forms another factor with which to measure reduced confidence.

It should be taken into account that averaging or comparing motion vectors requires a conversion to "current time". In other words, an object which is moving to the lower right will be found above and left in the previous frame, and farther above and left in the frame which is two previous. Thus, it is useful to invert and/or scale, as required, the motion vectors to all be in units of the current frame's motion vectors with respect to the very next frame.

When weighting the motion vector averages, rather than using fixed weightings, based upon being one vs. two (or more) frames away, it is also possible to weight the motion vectors for each pixel based upon the confidence factors. Thus, the motion vectors can be combined with weightings determined by their individual confidence values, using one or more of the confidence measures. This affords a resulting average motion vector, or set of motion vectors, which have confidence weightings built-in, thereby improving the user's assurance level in using them. Note that it is not necessary to result in a single motion vector. Multiple motion vectors for each pixel can be usefully used, and the combinations can occur in pixel values or other ways, again with the possibility of weighting via confidence factors. For example, the motion compensated images, which are composed by looking to previous or subsequent frames using the motion vectors, can be averaged with the current frame to produce a noise-reduced image. De-interlacing can also utilize this technique to improve the quality of the non-interlaced result. Frame images can be made from every single motion vector file by looking through the given motion vectors for each corresponding previous or subsequent frame. All of the resulting frames, each a useful picture, can then be averaged to produce a combined image which is actually composed of information from many frames by using these frame-motion extractions. Again, confidence factors can be used to weight the combining steps for these new combined motion-compensated noise-reduced and de-interlaced frames.

Frame Rate Conversion

In addition to the value of utilizing pixel-accurate and sub-pixel-accurate motion vectors for noise reduction and de-interlacing, frame rate conversion can also be achieved. For frame rate conversion, all of the pathological cases (such as Venetian blinds in interlaced field-frames, and backward-rotating-wagon-wheels, objects entering/leaving past edges, lake surfaces, and blowing leaves on any interlaced or non-interlaced image) also affect the utilization of motion vectors. Again, the "best match" may not be good enough due to these types of problems. Thus, the confidence factors provide valuable information, and thresholds will be helpful.

In general, frame rate conversion involves making a new frame at a time in-between two frames or fields of input. When making a new frame in between two existing frames, one can both move forward from the earlier of the two frames, as well as move backward from the later frame. If confidence factors are good going forward from the frame before or coming from the frame after, then motion vectors can be applied to pixels to create a new frame in-between. Pixels from the earlier frame can be moved forward in time along a forward going motion vector from the earlier frame. Similarly, pixels from the later frame can be moved backward in time. An average of these two frames can be created where the weighting of the earlier and later frame is proportional to the new frame's time between the two frames. Thus, if the new frame is nearer the earlier frame, the new frame should be composed of a proportionately higher amount of the earlier frame. Likewise, if the new frame is nearer the later frame, the later frame's contribution should be higher. If the frame is exactly between, then equal amounts should be utilized if the confidence factors are equal. Since the confidence factors from the later frame toward the earlier frame should be similar to the earlier frame toward the later frame, this weighting should roughly equal the new frame's position between the frames. However, any region which has a better match in one or the other frame should naturally have higher weight.

Figure 10:
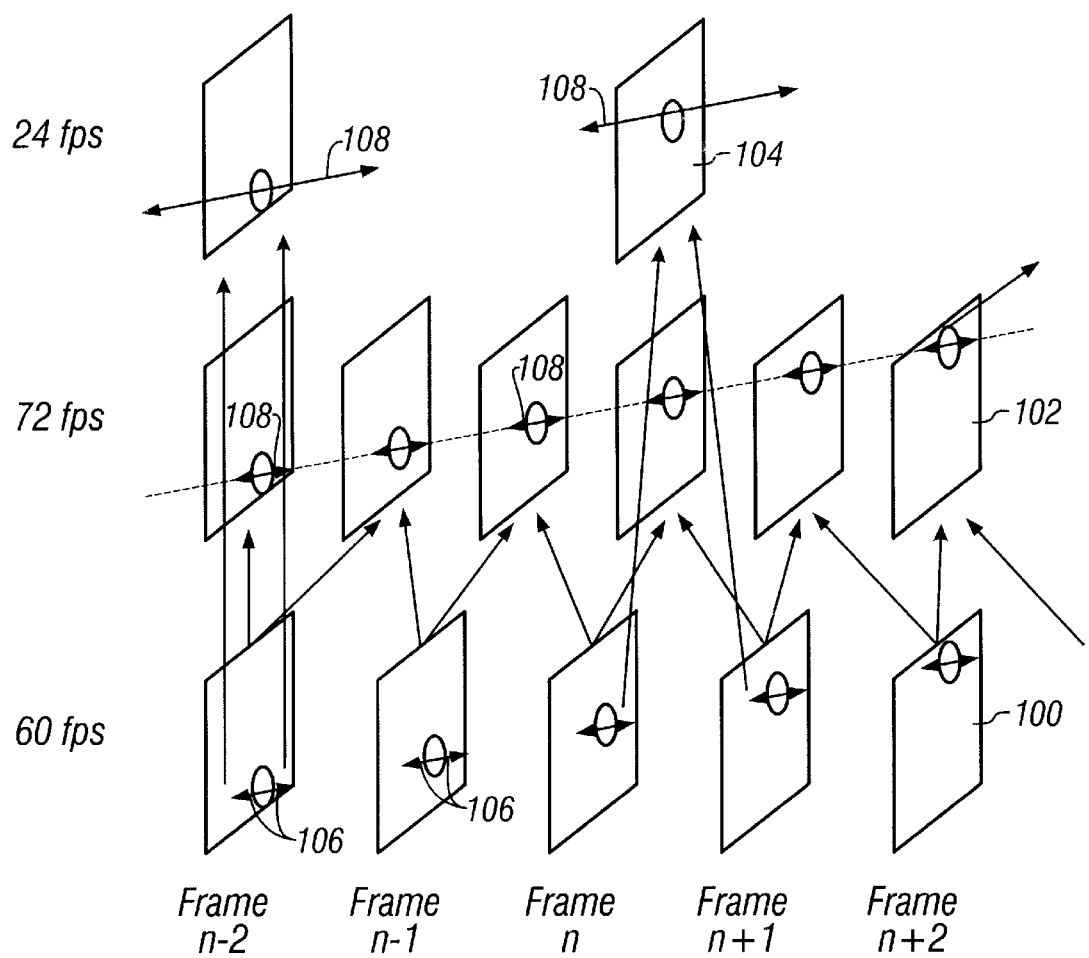
FIG. 10 is a diagram showing a base set of frames taken at 60 fps which are converted to a set of frames at 72 fps and to a set of frames at 24 fps.

FIG. 10 is a diagram showing a base set of frames 100 taken at 60 fps which are converted to a set of frames 102 at 72 fps and to a set of frames 104 at 24 fps. The motion vectors 106 computed for the base set of frames 100 are used to construct intermediate frames for each of the other two sets 102, 104.

In a position where no good match can be found, as determined by thresholds, a fall-back position is needed for the pixel values of the frame being constructed. It is also possible, when moving pixels according to motion vectors, that holes open up in the constructed image if no particular motion vector moves to a particular position. For these holes, a fall back value for the pixels is needed as well.

In the preferred embodiment, all of the pixels of the frame being constructed are preloaded by values that are in proportion to the earlier and later frames, based upon the new-frame's location (as above), but without any motion compensation. Thus, if no high confidence motion vectors are available (as with a cut or a pathological case), or if no motion vector "touches" a given pixel, all pixels with such "default" values will "cross dissolve" between the adjacent frames.

An issue similar to the possibility of holes opening up on a new frame is the possibility multiple pixels will move from adjacent frames into a given pixel in the new frame. For example, the new pixel might have information from 5–10 pixels from the adjacent frames. It will also be necessary to utilize a weighting filter to place the new pixels, since they will have sub-pixel resolution, as well as needing a circular weighting function to prevent aliasing. In the preferred embodiment, a cone filter is used (although Gaussian, truncated sinc, and other filters can also be used). The radius of the cone filter is specified based upon the specific situation. In the preferred embodiment, the double-resolution motion vector images and adjacent frame images are used to create a new frame at double resolution.

Further, the motion vector proportions for the new frame, based upon its position in time between the two adjacent frames, will result in sub-pixel resolution even at double resolution. This new position forms the center of the cone filter, whose radius is about 2.5 pixels, since these pixels are being placed at double the final resolution. This corresponds to a fairly optimal filter having a cone filter radius equivalent to about 1.25 pixels at the final resolution.

The cone filter is preferably implemented by use of a four dimensional lookup table. Two dimensions are the X and Y locations over a square of the circular cone filter weighting. The remaining two dimensions, preferably implemented as 4 bits each (thus allowing 16 elements), represent X and Y sub-pixel position coordinates (at double resolution in the preferred embodiment). It is easily seen that other filters, such as Gaussian or truncated sinc filters, can be implemented by loading this lookup table appropriately. The table need only contain the value of the weighting for each position based upon the X and Y (horizontal and vertical) and sub-pixel location.

In the preferred embodiment, the radius weighting as well as the issue of multiple overlapping cone and motion vector placement positions are handled by utilizing a normalizing value. Each time a pixel is moved along a motion vector, its destination is placed according to the proportional amount along the motion vector for the new frame. At that position (including the sub-pixel values), a cone filter is used to place the pixel's value in all the positions under the cone. The pixel value is weighted by a combination of the cone filter, which includes the sub-pixel placement, and a selected confidence factor. The combined weight is also saved, flagging that the given pixel has some amount of actually moved pixel, thus replacing the original initialized in-place proportional picture. Each subsequent pixel which is "touched" will add to the pixels' RGB values according to this combined weighting, with the new weighting being added as well to the total combined weight. The new frame position in the preferred embodiment is handled by weighting the resulting pictures (which is a simple proportion of the earlier and later frame), and is also applied at this stage.

When the image is complete, for all pixels which have been touched (even by the smallest amount, such as at the edge of a single cone), the RGB values are normalized by the total combined weight. This results in a picture which has the proper weightings of RGB for proper filtering, confidence, and motion between the adjacent frames.

Note also that the motion vectors which point forward from an earlier frame and backward from a later frame can be usefully augmented by motion vectors pointing backward from the earlier frame and forward from the later frame. This can help provide some additional redundancy and orthogonality, and therefore improve the potential result. It is also possible to utilize the median-filtered and averaged motion vectors described above, in the expectation that they might also help establish the trajectory of a given pixel within the image.

Motion Blur

If the frame rate conversions are between nearby frame rates, such as 24 fps to/from 30 fps or 72 fps to/from 60 fps, the inherent motion blur of the original signal will be reasonable. However, for other desirable conversions, such as 60 fps interlaced or non-interlaced to 24 fps, the motion blur 108 (see FIG. 10) must increase by a factor of two or three over the motion blur of the original.

Such motion blur can be determined utilizing the same mechanisms as for basic frame rate conversion. However, instead of placing a single pixel cone (or Gaussian, truncated sinc, or other) filter at a position directed by the motion vector, the system instead "streaks" a line of such cones along the motion vector to create a blur. This is accomplished in the preferred embodiment by placing a series of cones filters at single pixel steps along the motion vector line. The line extends plus and minus half its length centered about the new pixel position center.

It can be easily seen that these line sweeps for the blurs in moving areas are going to naturally overlap each other. This overlap is automatically normalized by the weighting and cone filter technique. A weight for each cone along the line is added, just as with the basic frame rate conversion.

Further, each weight is multiplied by a selected confidence factor. Thus, some blur lines are scanned with lower weightings, when their confidence factor is low. Higher confidence lines in the same regions will have proportionately higher influence on the final pixel results. This use of a confidence factor helps reduce the artifacts which can occur due to pathological temporal cases.

This motion blur technique can be applied even if there is no frame rate conversion. For example, motion blur can be added to computer graphics without motion blur, or to stop motion or hand-drawn animation.

Computer Implementation

The invention may be implemented in hardware or software, or a combination of both (e.g, programmable logic arrays). Unless otherwise specified, the algorithms included as part of the invention are not inherently related to any particular computer or other apparatus. In particular, various general purpose machines may be used with programs written in accordance with the teachings herein, or it may be more convenient to construct more specialized apparatus (e.g., an integrated circuit) to perform the required method steps. However, preferably, the invention is implemented in one or more computer programs executing on programmable systems each comprising at least one processor, at least one data storage system (including volatile and non-volatile memory and/or storage elements), at least one input device, and at least one output device. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on a storage media or device (e.g., ROM, CD-ROM, or magnetic or optical media) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. Accordingly, other embodiments are within the scope of the following claims.

What is claimed is:

1. A method of temporal processing of motion picture image frames each comprising a plurality of pixels, including the steps of:
   (a) determining at least one motion vector corresponding to each pixel of a current frame relative to at least one previous or subsequent image frame by performing a hierarchical motion vector search including at least:
      (1) a first search between a matching region associated with each pixel of the current frame and a sequence of search regions at a first resolution within such at least one previous or subsequent image frame; and
      (2) a second search between the matching region and a sequence of search regions at a second resolution within such at least one previous or subsequent image frame;
   (b) saving the determined motion vectors.

2. The method of claim 1, further including the steps of:
   (a) for each pixel of the current frame, applying at least one such corresponding motion vector to define a new pixel;
   (b) outputting all of such new pixels as a constructed image frame.

3. The method of claim 2, wherein the temporal processing results in a set of such constructed image frames having a frame rate different from the frame rate of the motion picture image frames.

4. The method of claim 2, wherein the temporal processing results in a set of such constructed image frames having motion compensated reduced noise compared to the motion picture image frames.

5. The method of claim 1, wherein the step of determining at least one motion vector includes determining a plurality of motion vectors corresponding to each pixel of the current frame.

6. The method of claim 1, wherein the step of determining at least one motion vector includes applying at least one match criteria for each such matching region and sequence of search regions.

7. The method of claim 6, wherein the step of applying at least one match criteria includes applying a DC minimum area difference match criteria.

8. The method of claim 6, wherein the step of applying at least one match criteria includes applying an AC maximum area correlation match criteria.

9. The method of claim 1, wherein the step of determining at least one motion vector includes applying a weighting function such that motion vectors are biased towards shorter lengths.

10. The method of claim 1, further including the step of computing a confidence factor for each motion vector.

11. The method of claim 10, wherein the confidence factor is based upon a DC minimum area difference function.

12. The method of claim 10, wherein the confidence factor is based upon an AC maximum area correlation function.

13. The method of claim 10, further including the steps of:
   (a) defining at least one threshold value; and
   (b) screening out motion vectors having a confidence factor below such threshold value.

14. The method of claim 10, wherein the confidence factor is based upon a local gradient among motion vectors.

15. The method of claim 1, wherein motion vectors are stored as picture image values.

16. The method of claim 1, further including the steps of:
   (a) for each pixel of the current frame, applying motion vectors corresponding to multiple image frames to define a new pixel;
   (b) outputting all of such new pixels as a constructed image frame.

17. The method of claim 16, wherein the temporal processing results in a set of such constructed image frames having a frame rate different from the frame rate of the motion picture image frames.

18. The method of claim 16, wherein the temporal processing results in a set of such constructed image frames having motion compensated reduced noise compared to the motion picture image frames.

19. The method of claim 16, wherein the temporal processing results in a set of de-interlaced constructed image frames.

20. The method of claim 16, further including the step of computing a confidence factor for each motion vector.

21. The method of claim 20, further including the step of weighting use of each motion vector by a corresponding confidence factor.

22. The method of claim 20, further including the step of weighting each motion vector by an overall confidence factor and a regional confidence factor.

23. The method of claim 20, further including the step of determining a statistical variance for a set of confidence factors as a further measure of confidence.

24. The method of claim 16, further including the step of applying the motion vectors to add motion blur to the constructed image.

25. The method of claim 16, further including the step of applying a filter function to each new pixel touched by the applied motion vectors.

26. The method of claim 25, wherein the filter function is a selected from a set consisting of a cone filter, Gaussian filter, or truncated sinc filter.

27. The method of claim 25, further including the step of normalizing each pixel that has been filtered by a total combined weight function.

28. The method of claim 1, wherein the first resolution is a reduced resolution relative to the second resolution.

29. The method of claim 1, wherein the second resolution is a higher resolution relative to the first resolution.

30. The method of claim 1, further including a third search between the matching region and a sequence of search regions at a third resolution within such at least one previous or subsequent image frame.

31. The method of claim 30, wherein the first resolution is a reduced resolution relative to the second resolution, and the third resolution is a higher resolution relative to the second resolution.

32. The method of claim 1, further including the step of using motion vectors determined during the first search as guide vectors in determining corresponding motion vectors during the second search.

33. A system of temporal processing of motion picture image frames each comprising a plurality of pixels, including:
  (a) means for determining at least one motion vector corresponding to each pixel of a current frame relative to at least one previous or subsequent image frame by performing a hierarchical motion vector search including at least:
    (1) a first search between a matching region associated with each pixel of the current frame and a sequence of search regions at a first resolution within such at least one previous or subsequent image frame; and
    (2) a second search between a matching region and a sequence of search regions at a second resolution within such at least one previous or subsequent image frame;
  (b) means for saving the determined motion vectors.

34. The system of claim 33, further including:
  (a) means for applying at least one such corresponding motion vector to define a new pixel for each pixel of the current frame;
  (b) means for outputting all of such new pixels as a constructed image frame.

35. The system of claim 34, wherein the temporal processing results in a set of such constructed image frames having a frame rate different from the frame rate of the motion picture image frames.

36. The system of claim 34, wherein the temporal processing results in a set of such constructed image frames having motion compensated reduced noise compared to the motion picture image frames.

37. The system of claim 33, wherein the means for determining at least one motion vector includes means for determining a plurality of motion vectors corresponding to each pixel of the current frame.

38. The system of claim 33, wherein the means for determining at least one motion vector includes means for applying at least one match criteria for each such matching region and sequence of search regions.

39. The system of claim 38, wherein the means for applying at least one match criteria includes means for applying a DC minimum area difference match criteria.

40. The system of claim 38, wherein the means for applying at least one match criteria includes means for applying an AC maximum area correlation match criteria.

41. The system of claim 33, wherein the means for determining at least one motion vector includes means for applying a weighting function such that motion vectors are biased towards shorter lengths.

42. The system of claim 33, further including means for computing a confidence factor for each motion vector.

43. The system of claim 42, wherein the confidence factor is based upon a DC minimum area difference function.

44. The system of claim 42, wherein the confidence factor is based upon an AC maximum area correlation function.

45. The system of claim 42, wherein the confidence factor is based upon a local gradient among motion vectors.

46. The system of claim 42, further including:
  (a) means for defining at least one threshold value; and
  (b) means for screening out motion vectors having a confidence factor below such threshold value.

47. The computer program of claim 42, wherein the confidence factor is based upon a DC minimum area difference function.

48. The computer program of claim 42, wherein the confidence factor is based upon an AC maximum area correlation function.

49. The computer program of claim 42, wherein the confidence factor is based upon a local gradient among motion vectors.

50. The system of claim 33, wherein motion vectors are stored as picture image values.

51. The system of claim 33, further including:
  (a) means for applying motion vectors corresponding to multiple image frames to define a new pixel for each pixel of the current frame;
  (b) means for outputting all of such new pixels as a constructed image frame.

52. The system of claim 51, wherein the temporal processing results in a set of such constructed image frames having a frame rate different from the frame rate of the motion picture image frames.

53. The system of claim 51, wherein the temporal processing results in a set of such constructed image frames having motion compensated reduced noise compared to the motion picture image frames.

54. The system of claim 51, wherein the temporal processing results in a set of de-interlaced constructed image frames.

55. The system of claim 51, further including means for computing a confidence factor for each motion vector.

56. The system of claim 55, further including means for weighting use of each motion vector by a corresponding confidence factor.

57. The system of claim 55, wherein the filter function is a selected from a set consisting of a cone filter, Gaussian filter, or truncated sinc filter.

58. The system of claim 55, further including means for normalizing each pixel that has been filtered by a total combined weight function.

59. The system of claim 55, further including means for weighting each motion vector by an overall confidence factor and a regional confidence factor.

60. The system of claim 55, further including means for determining a statistical variance for a set of confidence factors as a further measure of confidence.

61. The system of claim 51, further including means for applying the motion vectors to add motion blur to the constructed image.

62. The system of claim 51, further including means for applying a filter function to each new pixel touched by the applied motion vectors.

63. The system of claim 33, wherein the first resolution is a reduced resolution relative to the second resolution.

64. The system of claim 33, wherein the second resolution is a higher resolution relative to the first resolution.

65. The system of claim 33, further including means for performing a third search between the matching region and a sequence of search regions at a third resolution within such at least one previous or subsequent image frame.

66. The system of claim 65, wherein the first resolution is a reduced resolution relative to the second resolution, and the third resolution is a higher resolution relative to the second resolution.

67. The system of claim 33, further including means for using motion vectors determined during the first search as guide vectors in determining corresponding motion vectors during the second search.

68. A computer program, stored on a computer-readable medium, for temporal processing of motion picture image frames each comprising a plurality of pixels, ) the computer program including instructions for causing a computer to:
　(a) determine at least one motion vector corresponding to each pixel of a current frame relative to at least one previous or subsequent image frame by performing a hierarchical motion vector search including at least:
　　(1) a first search between a matching region associated with such pixel of the current frame and a sequence of search regions at a first resolution within such at least one previous or subsequent image frame; and
　　(2) a second search between a matching region and a sequence of search regions at a second resolution within such at least one previous or subsequent image frame;
　(b) save the determined motion vectors.

69. The computer program of claim 68, further including instructions for causing the computer to:
　(a) for each pixel of the current frame, apply at least one such corresponding motion vector to define a new pixel;
　(b) output all of such new pixels as a constructed image frame.

70. The computer program of claim 69, wherein the temporal processing results in a set of such constructed image frames having a frame rate different from the frame rate of the motion picture image frames.

71. The computer program of claim 69, wherein the temporal processing results in a set of such constructed image frames having motion compensated reduced noise compared to the motion picture image frames.

72. The computer program of claim 68, wherein the instructions causing the computer to determine at least one motion vector include instructions for causing the computer to determine a plurality of motion vectors corresponding to each pixel of the current frame.

73. The computer program of claim 68, wherein the instructions causing the computer to determine at least one motion vector include instructions for causing the computer to apply at least one match criteria for each such matching region and sequence of search regions.

74. The computer program of claim 73, wherein the instructions causing the computer to apply at least one match criteria include instructions for causing the computer to apply a DC minimum area difference match criteria.

75. The computer program of claim 73, wherein the instructions causing the computer to apply at least one match criteria include instructions for causing the computer to apply an AC maximum area correlation match criteria.

76. The computer program of claim 68, wherein the instructions causing the computer to determine at least one motion vector include instructions for causing the computer to apply a weighting function such that motion vectors are biased towards shorter lengths.

77. The computer program of claim 68, further including instructions for causing the computer to compute a confidence factor for each motion vector.

78. The computer program of claim 77, further including instructions for causing the computer to:
　(a) define at least one threshold value; and
　(b) screen out motion vectors having a confidence factor below such threshold value.

79. The computer program of claim 68, wherein motion vectors are stored as picture image values.

80. The computer program of claim 68, further including instructions for causing the computer to:
　(a) apply motion vectors corresponding to multiple image frames to define a new pixel for each pixel of the current frame;
　(b) output all of such new pixels as a constructed image frame.

81. The computer program of claim 80, wherein the temporal processing results in a set of such constructed image frames having a frame rate different from the frame rate of the motion picture image frames.

82. The computer program of claim 80, wherein the temporal processing results in a set of such constructed image frames having motion compensated reduced noise compared to the motion picture image frames.

83. The computer program of claim 80, wherein the temporal processing results in a set of de-interlaced constructed image frames.

84. The computer program of claim 80, further including instructions for causing the computer to compute a confidence factor for each motion vector.

85. The computer program of claim 84, further including instructions for causing the computer to weight use of each motion vector by a corresponding confidence factor.

86. The computer program of claim 84, wherein the filter function is a selected from a set consisting of a cone filter, Gaussian filter, or truncated sinc filter.

87. The computer program of claim 84, further including instructions for causing the computer to normalize each pixel that has been filtered by a total combined weight function.

88. The computer program of claim 84, further including instructions for causing the computer to weight each motion vector by an overall confidence factor and a regional confidence factor.

89. The computer program of claim 84, further including instructions for causing the computer to determine a statistical variance for a set of confidence factors as a further measure of confidence.

90. The computer program of claim 80, further including instructions for causing the computer to apply the motion vectors to add motion blur to the constructed image.

91. The computer program of claim 80, further including instructions for causing the computer to apply a filter function to each new pixel touched by the applied motion vectors.

92. The computer program of claim 68, wherein the first resolution is a reduced resolution relative to the second resolution.

93. The computer program of claim 68, wherein the second resolution is a higher resolution relative to the first resolution.

94. The computer program of claim 68, further including instructions for causing the computer to perform a third search between the matching region and a sequence of search regions at a third resolution within such at least one previous or subsequent image frame.

95. The computer program of claim 94, wherein the first resolution is a reduced resolution relative to the second resolution, and the third resolution is a higher resolution relative to the second resolution.

96. The computer program of claim 68, further including instructions for causing the computer to use motion vectors determined during the first search as guide vectors in determining corresponding motion vectors during the second search.

* * * * *

UNITED STATES PATENT AND TRADEMARK OFFICE
CERTIFICATE OF CORRECTION

PATENT NO. : 6,442,203 B1
DATED : August 27, 2002
INVENTOR(S) : Gary A. Demos

It is certified that error appears in the above-identified patent and that said Letters Patent is hereby corrected as shown below:

<u>Title page,</u>
Item [75], Inventors: please replace "Gary E. Demos" with -- Gary A. Demos --.

Signed and Sealed this

Fifteenth Day of October, 2002

*Attest:*

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO. : 6,442,203 B1
DATED : August 27, 2002
INVENTOR(S) : Demos

It is certified that error appears in the above-identified patent and that said Letters Patent is hereby corrected as shown below:

Title page,
Item [56], References Cited, U.S. PATENT DOCUMENTS, please insert the following references:

| | | |
|---|---|---|
| -- 5,995,154 | 11/1999 | Heimburger |
| 5,784,114 | 7/1998 | Borer et al. |
| 5,754,246 | 5/1998 | Flannaghan |
| 5,787,203 | 7/1998 | Lee et al. |
| 5,546,130 | 8/1996 | Hackett et al. |
| 6,040,864 | 3/2000 | Etoh |
| 6,192,080 | 2/2001 | Sun et al. |
| 5,600,377 | 2/1997 | David et al. |
| 5,610,662 | 3/1997 | Hackett |
| 5,619,272 | 4/1997 | Salmon et al. --. |

Signed and Sealed this

Sixth Day of September, 2005

JON W. DUDAS
*Director of the United States Patent and Trademark Office*